June 23, 1942.    O. S. FRENCH    2,287,608
JOINT ASSEMBLY
Filed May 10, 1940
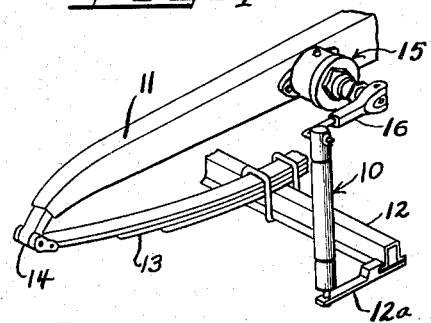
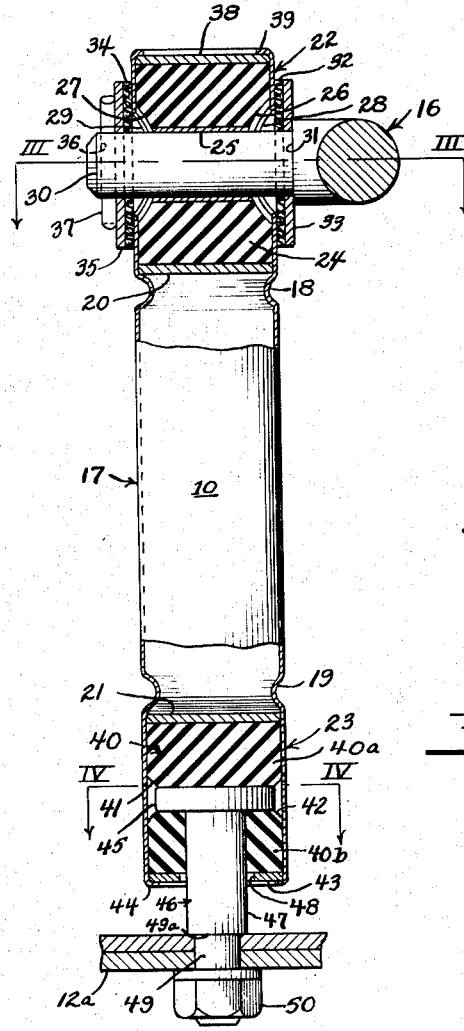
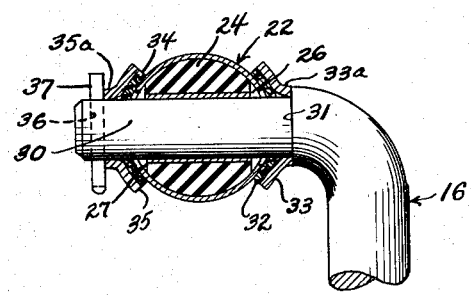
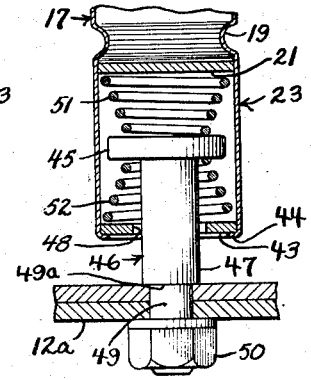
Inventor
Oliver S. French
by Charles W. Hill Attys Patented June 23, 1942

2,287,608

UNITED STATES PATENT OFFICE 2,287,608

JOINT ASSEMBLY

Oliver S. French, Detroit, Mich., assignor to Thompson Products Incorporated, Cleveland, Ohio, a corporation of Ohio Application May 10, 1940, Serial No. 334,317

1 Claim. (Cl. 74—579)

The present invention relates to connecting links having resilient joints, and more particularly relates to a resilient joint assembly adapted for use in the stabilizer or shock absorber linkage of automotive vehicles.

Shock absorber links have heretofore included rubber bushed studs or connection arms extending laterally or transversely of the link housing, thus requiring at least two openings in the housing side walls.

The present invention now provides a link wherein one stud projects through an end of the housing while the other stud projects through the housing side wall. The link, in operative position on an automotive vehicle is disposed in upright position by clamping the longitudinal or end stud thereof in vertical position. The resilient stud mounting or bushing in the housing of course permits tilting of the link but it will normally return to an upright position upon release of displacing forces.

It is, then, an important object of this invention to provide a link having a resiliently mounted stud projecting through an end thereof.

Another object of this invention is the provision of links having resiliently mounted transverse and longitudinal studs or connection arms at opposite ends thereof.

A further object of this invention is to provide a link joint construction which will automatically take up wear in the parts thereof and which is self-adjusting to permit the link to efficiently operate over a limited angular range relative to its normal position.

The novel features believed to be characteristic of the present invention are set forth with particularity in the appended claim. The invention itself, however, both as to its organization and manner of construction, together with further objects and advantages thereof, may best be understood by reference to the following description taken in connection with the accompanying drawing, in which:

Figure 1 is an isometric projection showing a fragment of an automotive vehicle frame, spring and axle and a shock absorber linkage embodying a link according to the principles of this invention between the frame and the axle;

Figure 2 is an enlarged longitudinal view, with end portions in broken vertical cross-section and parts in elevation, of the link illustrated in Figure 1;

Figure 3 is a transverse cross-sectional view, with parts in elevation, taken substantially in the plane indicated by the line III—III of Figure 2;

Figure 4 is a transverse cross-sectional view, looking down on the headed stud, taken substantially along the plane indicated by the line IV—IV of Figure 2; and Figure 5 is a fragmentary vertical cross-sectional view, similar to the lower portion of the link illustrated in Figure 2, and showing a modified form of joint assembly.

The invention to be described herein is shown as embodied in a link generally designated by the reference numeral 10 and which is particularly adapted for use as a connection between the axle and the shock absorber of an automotive vehicle.

Figure 1 illustrates a portion of the frame 11 of a vehicle which is supported upon the vehicle axle 12 by means of a spring 13 and shackled to the frame as at 14 in the usual or well-known manner. A shock absorber 15, which forms no part of this invention, is connected to the frame 11 and is provided with an operating arm 16 having a pivotal connection to the upper end of the link 10 in a manner to be more fully described hereinafter. The opposite or lower end of the link 10 is pivotally secured to a bracket 12a which is clamped to the axle 12 by any suitable means.

As best shown in Figure 2, the link 10 has a tubular housing 17 formed from sheet metal. A pair of inwardly facing beads 18 and 19 are formed in the side walls of the tubular housing 17, each in spaced relation from the ends of the housing.

A pair of circular plates 20 and 21, each having approximately the same diameter as the inside diameter of the tubular housing 17, are inserted within the housing to each engage against a bead formed in the side walls thereof. These plates and their adjacent housing ends define an upper bearing housing 22 and a lower bearing housing 23.

A resilient bearing 24, preferably of molded rubber or similar material, is inserted within the upper bearing housing 22 to seat against the circular plate 20 which defines an end wall therefor.

The bearing 24 is suitably apertured or bored in a direction transversely of the longitudinal axis of the housing 17 to receive therein a sleeve 25. At both ends of the sleeve 25, the bearing 24 is provided with segmental spherical recesses 26 and 27. While it is preferred that the recesses be shaped as illustrated, the provision of any recess will satisfactorily allow the bearing 24 to operate in a manner to be more fully described hereinafter.

Suitable diametrically arranged openings 28 and 29 are provided in the side walls of the housing 17 in registry with the sleeve 25 and the recesses 26 and 27.

As best illustrated in Figure 3, the free end 30 of the operating arm 16 of the shock absorber is offset at a right angle and reduced in size to form a shoulder 31.

The reduced end portion 30 is inserted through the sleeve 25 with the shoulder 31 being maintained in spaced relation from the side wall of the tubular bearing housing 22 by means of a fabric liner or seal 32 and a metal segmental cylindrical washer 33. As shown in Figure 3, the central portion of the washer 33 is bulged outwardly at its aperture to form a boss 33a receiving the shoulder 31 on the operating arm 16 thereagainst.

A similar liner and washer assembly 34 and 35 is provided to seal the opposite side wall opening 29. The washer 35 is provided with a bulged or bossed portion 35a in the same manner as the boss 33a on the washer 33. The washers 33 and 35 are cylindrically curved to cause the liners to hug the outer face of the bearing housing 22 around the openings 28 and 29 to seal the housing against ingress of dirt.

The projecting end of the reduced portion 30 is drilled to provide a transverse bore 36 therethrough receiving a cotter pin or key 37 bearing against the washer 35 to lock the bearing housing 22 between the pairs of washers described.

A circular plate 38, similar to the plate 20, is inserted against the upper end of the yieldable bearing 24 and is retained in place by spinning or peening the edges 39 of the housing over and against the plate.

It is to be noted that the engagement between the operating arm 16 and the bearing housing 22 allows for free relative rotative movement and for limited angular movement therebetween. The recesses 26 and 27 allow for bulging of the rubber bearing 24 when said relative angular movement takes place.

If desired, the sleeve 25 may be slotted lengthwise or split to slidingly grip the reduced portion 30 of the operating arm 16 by pressure applied by the bearing 24. By slotting or splitting the sleeve, compensation for wear on the reduced portion 30 is automatically adjusted.

At the lower end of the link 10, in the bearing housing 23, there is inserted a resilient or yieldable bearing 40. This bearing, like the bearing 24, is preferably of molded rubber or similar material. The bearing consists of half portions or blocks 40a and 40b, each of which are identical in contour.

The bearing half portion 40a is shaped to complementally seat within the housing 23 and to abut against the end plate 21. Its lower corner is beveled to provide a sloping surface 41.

The lower bearing half portion 40b has an axial bore or aperture therethrough and is beveled at its upper corner to provide a sloping surface 42. The lower surface of the bearing half portion seats against a centrally apertured end plate 43 which is maintained in position by the spun or peened edges 44 at the end of the bushing 23.

As shown in Figure 2, the half portions of the bearing 40 provide a space therebetween within which is seated the head 45 of a stud 46. The diameter of the head 45 is substantially the diameter of the engaging surfaces of the bearing half portions defined by the sloping surfaces 41 and 42.

The stud 46 has a shank 47 projecting through the axial bore in block 40b and through the enlarged aperture 48 provided in the end plate 43. The shank 47 terminates in a reduced portion 49 which extends through an aperture provided in the bracket 12a and is connected thereto by means of the threaded engagement of a nut 50. A shoulder 49a is formed between the shank 47 and its reduced portion 49 to thrust against the bracket 12a and the stud is thus clamped in vertical position.

It is to be noted that the resiliency of the half portions of the bearing 40 allow for limited relative axial movement between the stud 46 and the bearing housing 23. The enlarged aperture 48 also allows for limited relative angular movement therebetween, in which case the yieldable bearing half portions bulge into the openings provided by the sloping surfaces 41 and 42.

A modified joint assembly for the bearing housing 23 is illustrated in Figure 5. Instead of the bearing half portions 40a and 40b, there is substituted a pair of helical springs 51 and 52. The upper helical spring 51 has its large end seated against the end plate 21 and the lower helical spring 52 has its large end seated against the apertured end plate 43. The small end of the spring 51 seats against the top of the stud head 45 while the helical spring 52 is disposed around the stud shank 47 with its reduced end engaging the under side surface of the stud head 45. The springs are of sufficient strength to normally maintain the axis of the stud 46 in coincidence with the longitudinal axis of the link 10. The resiliency of the springs also allows the parts to move in relative angular axial directions.

It is to be noted that the link 10 when constructed as described above is capable of movement in an endwise direction with its axis in coincidence with the axis of the stud or in angularity thereto.

It will be seen that this invention provides a link assembly which may be used wherever a connecting rod is needed. The particular construction of the link is inexpensive to manufacture and, when used with the combination as set forth, is resiliently held in vertical position and tends to retain this position while of course providing for rotative and angular movements.

While particular embodiments only of this invention have been illustrated, it will, of course, be understood that the invention should not be limited thereto, since many modifications may be made, and, therefore, it is contemplated by the appended claim to cover all such modifications as fall within the true spirit and scope of the present invention.

I claim as my invention:

In a shock absorber assembly including a link having side and end walls defining bushing housings at the ends thereof, a shock absorber with a swingable arm having an end portion extending through the side wall of the link into one bushing housing of the link, means in said bushing housing resiliently mounting said end portion of said arm, and a construction acted on by said shock absorber through said link, the improvements which comprise a headed stud fixedly mounted on said construction having a shank extending through an end wall of said link in spaced relation from said end wall and a head with opposed faces seated in the other bushing housing of the link, a resilient member in said other bushing housing receiving the stud shank and having an end face abutting one face of the stud head, and a second resilient member in said other bushing housing having an end face abutting the opposite face of the stud head, said resilient members resisting relative tilting movements between the stud and link whereby the link is adapted to wobble relative to the construction upon misalignment of the stud and resiliently mounted end portion of the arm while said resilient members urge the link to realign said stud and end portion of the arm thereby aiding the shock absorber.

OLIVER S. FRENCH.